No. 839,119. PATENTED DEC. 25, 1906.
C. B. DARRIN.
PROCESS FOR EXTRACTING PRODUCTS FROM RESINOUS WOOD.
APPLICATION FILED JUNE 10, 1901.
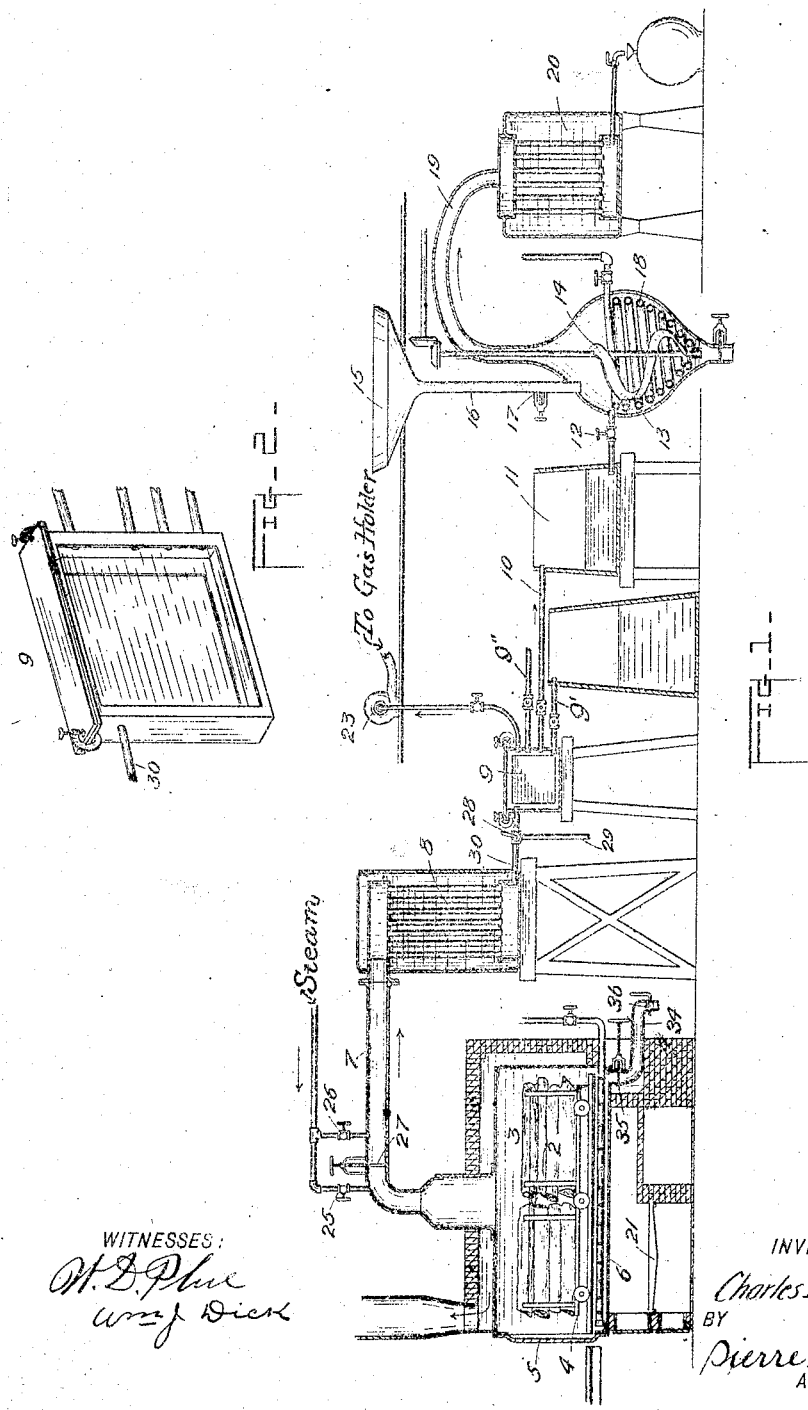
WITNESSES:
INVENTOR
Charles B. Darrin
BY
Pierre Barnes
ATTORNEY ic
UNITED STATES PATENT OFFICE.

CHARLES B. DARRIN, OF WALLA WALLA, WASHINGTON.

PROCESS FOR EXTRACTING PRODUCTS FROM RESINOUS WOOD.

No. 839,119.　　　Specification of Letters Patent.　　　Patented Dec. 25, 1906.

Application filed June 10, 1901. Serial No. 63,855.

*To all whom it may concern:*

Be it known that I, CHARLES B. DARRIN, a citizen of the United States, residing at Walla Walla, in the county of Wallawalla and State of Washington, have invented a certain new and useful improved Process for Extracting Products from Resinous Wood, of which the following is a specification, reference being had therein to the accompany10 ing drawings.

My invention relates to the treatment of resinous woods, more particularly fir, by destructive distillation for extracting therefrom turpentine, pitch, tar, tar-oil, pyrolig15 neous acid, from which alcohol and the acetates are produced, and the by-products, gas and charcoal; and the object of my invention is the speedy and effectual extraction of the said products by a process which, while it is speedy and effectual, shall at the same time be cheap and so simple that skilled labor is not essential.

My improved process will be readily understood from the following description in connection with the accompanying drawings, in which—

Figure 1 is a general view of the apparatus used for carrying out my process, the several principal members thereof being shown in vertical section; and Fig. 2 is a perspective view of the distributer 9 of Fig. 1.

A charge of resinous wood 2 is taken into a retort 3 upon a car 4, preferably through an opening in the end of the retort, which is closed during operation by a door 5, adapted to be hermetically sealed. Steam under pressure is then introduced into the retort by a perforated pipe or pipes 6 to create a moist and diffusive heat therein at a temperature of 340° Fahrenheit, approximately, which is maintained for from one to two hours, according to the character of the wood, or until the greater part of the contained turpentine and pyroligneous acid within the charge has volatilized and passed, commingled with the steam, through conduit 7 to a condenser 8, where it is liquefied and thence flows by pipe 30 into a receiver 9, where by their specific gravities it separates into two well-defined layers of pyroligneous acid and turpentine. The latter, being the upper one, is readily drawn off through a pipe 10 to a collecting-vat 11, and thence by a pipe 12 to a still 13, in which it is decolorized and clarified by be55 ing mechanically mixed by a stirrer 14 with a quantity of lime and water (milk of lime) received from a hopper or slaking-pan 15 through a pipe 16, having a gate-valve 17 therein. The solution of turpentine and lime-water is maintained by a steam-coil 18 at a temperature of 320° Fahrenheit, approximately, to evaporate the turpentine therefrom, which fumes are conducted by a pipe 19 to a condenser 20, where it is liquefied free from decolorization and otherwise refined. After the said vapors of turpentine and pyroligneous acid or the greater portion of them have been driven off the steam is shut off from the retort and a fire built upon a grate 21, provided thereunder, and maintained until the charge is completely distilled and the products thereof extracted under a temperature of from 1,000° to 2,000° Fahrenheit, vapors of tar, tar-oil, and pyroligneous acid passing through the aforesaid conduit and condenser 7 and 8, respectively, to be delivered as a liquid and permanent gases to the receiver 9, the liquid settling in layers, as aforesaid, and the gas being extracted by a pump 23, which exhausts into a suitable gas-holder. Shortly after the steam is shut off from the retort 3 and dry heat at an increased temperature is applied pitch exudes from the charge and is withdrawn into a receptacle (not shown in the drawings) by a drain-pipe 34, having a gate-valve 35 and a cock 36 to regulate the flow. The tar which has not volatilized and passed with the other gases from the retort is finally drawn off through the drain-pipe 34, leaving only the charcoal as the residual of the charge. Returning now to the receiver 9, where the contents have settled into layers of tar, tar-oil, and pyroligneous acid, which may each be removed separately through a number of draw-pipes 9′ 9″ 10, provided at different heights, the tar and tar-oil in their present state for commercial uses and the pyroligneous acid to be further manipulated by any of the processes now in use to obtain alcohol and acetates therefrom.

To accelerate the transmission of the vapors through the conduit 7, which might become choked by deposits from condensation between treatments of different charges, and which condensations would stain or discolor the turpentine passing therethrough, I introduce steam into the said conduit through two pipes 25 and 26, which is controlled by valves therein and cut-off 27. During the cleaning the cut-off 27 is closed and the steam admitted through pipe 26 revaporizes or scours the inside of the said conduit as well as the pipes of condenser 8, the sediment being blown off through three-way valve 28 and outlet 29. In order to carry out my process with precision, I have invented a special receiver 9, Fig. 2, consisting of a case having glass side panels and a number of outlets positioned at different heights by which the several component parts of the contained fluid as they settle in layers are drawn off, their characteristics, such as color, their relative positions due to their difference in weights being observed through the said glass, and any desired layer, as turpentine, oil, or pyroligneous acid may be drawn off through the respective outlets.

The aforegoing-described treatment or process completely effects the purposes for which it is intended, with the following more-important advantages: By the use of steam introduced through a perforated pipe or pipes throughout the length of the retort a diffusive or even heat is obtained and the direct action of the steam upon the charge extracts a larger percentage of turpentine than is possible from the use of dry heat alone. The turpentine obtained by my process is freer from pitch-oils, &c., and therefore easier to clarify or decolorize. Steam also acts upon the charge to extract a greater quantity of pitch of a light color and superior in quality.

What I claim as new, and desire to secure by Letters Patent, is—

The herein-described process of extracting by-products from wood, consisting in introducing steam under pressure into a retort containing the wood to create a moist and diffusive heat at a temperature of approximately 340° Fahrenheit within said retort, conducting the by-products to a receiver, separating the different by-products in said receiver by their specific gravities, and conducting the lighter by-product to a vat, feeding said lighter by-products from said vat to a still, decolorizing and clarifying the said by-product in said still while maintaining it at a temperature of approximately 320° Fahrenheit, carrying away the turpentine fumes arising from said by-product during the clarification, and then applying dry heat to the retort to extract the pitch contained in the wood.

In testimony whereof I affix my signature in presence of two witnesses.

CHARLES B. DARRIN.

Witnesses:
 PIERRE BARNES,
 W. D. PLUE.